(12) United States Patent
Jo et al.

(10) Patent No.: US 8,719,532 B2
(45) Date of Patent: May 6, 2014

(54) TRANSFERRING DATA BETWEEN MEMORIES OVER A LOCAL BUS

(75) Inventors: Keun Soo Jo, Hwaseong-si (KR); Dong Yang Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 181 days.

(21) Appl. No.: 13/182,518

(22) Filed: Jul. 14, 2011

(65) Prior Publication Data

US 2012/0030414 A1 Feb. 2, 2012

(30) Foreign Application Priority Data

Jul. 27, 2010 (KR) ........................ 10-2010-0072175

(51) Int. Cl.
*G06F 13/16* (2006.01)
*G06F 12/06* (2006.01)

(52) U.S. Cl.
USPC .................... 711/165; 711/103; 711/E12.008

(58) Field of Classification Search
USPC .................................. 711/103, 165, E12.008
See application file for complete search history.

(56) References Cited

U.S. PATENT DOCUMENTS

| | | | |
|---|---|---|---|
| 6,553,450 B1 | 4/2003 | Dodd et al. | |
| 7,370,134 B2 * | 5/2008 | Jeddeloh | 710/311 |
| 2001/0052057 A1 | 12/2001 | Lai et al. | |
| 2004/0111577 A1 * | 6/2004 | Arimilli et al. | 711/162 |
| 2005/0081085 A1 * | 4/2005 | Ellis et al. | 714/5 |
| 2006/0090017 A1 * | 4/2006 | Kim et al. | 710/22 |
| 2006/0136687 A1 * | 6/2006 | Conley et al. | 711/162 |
| 2006/0193189 A1 * | 8/2006 | Nam | 365/223 |
| 2008/0140914 A1 * | 6/2008 | Jeon | 711/103 |
| 2009/0196101 A1 | 8/2009 | Abe | |
| 2009/0198935 A1 * | 8/2009 | Arimilli et al. | 711/165 |
| 2009/0244949 A1 * | 10/2009 | Ravasio et al. | 365/63 |
| 2009/0307418 A1 * | 12/2009 | Chen et al. | 711/105 |
| 2010/0161932 A1 * | 6/2010 | Stern et al. | 711/202 |
| 2010/0332727 A1 * | 12/2010 | Kapil et al. | 711/103 |
| 2011/0246701 A1 * | 10/2011 | Kano et al. | 711/103 |

* cited by examiner

*Primary Examiner* — Hal Schnee
(74) *Attorney, Agent, or Firm* — F. Chau & Associates, LLC

(57) ABSTRACT

A memory apparatus includes a local bus, a plurality of non-volatile memories, a first buffer, and a main controller. The non-volatile memories share the local bus. The first buffer is connected to the plurality of non-volatile memories via the local bus. The first buffer buffers data stored in the plurality of non-volatile memories. The main controller is configured to generate a control signal for controlling the first buffer to buffer data stored in a source memory of the plurality of non-volatile memories and transmit the data to a target memory.

17 Claims, 11 Drawing Sheets

TRANSFERRING DATA BETWEEN MEMORIES OVER A LOCAL BUS

CROSS-REFERENCE TO RELATED APPLICATIONS

This application claims priority under 35 U.S.C. §119 to Korean Patent Application No. 10-2010-0072175 filed on Jul. 27, 2010, the disclosure of which is incorporated by reference in its entirety herein.

BACKGROUND

1. Technical Field

Exemplary embodiments of the inventive concept relate to memory apparatuses, and more particularly, to a memory apparatus capable of directly transmitting and receiving data between memories without passing data through a main controller of the memory apparatus, a data controlling method performed in the memory apparatus, and devices including the memory apparatus.

2. Discussion of Related Art

Non-volatile memories can retain stored information even when power is not supplied. Examples of non-volatile memories include read only memory, flash memory, magnetic computer storage devices, optical discs, etc. Flash memories are widely used in computers and memory cards because data cells can be programmed or erased all together.

NOR flash memories and NAND flash memories are examples of flash memories. NOR flash memories may consume more current than NAND flash memories. NOR flash memories may be suitable for high speed operations, while NAND flash memories may be used as data storage devices.

SUMMARY

At least one embodiment of the present inventive concept may provide a memory apparatus that is capable of directly transmitting and receiving data between memories without passing data through a main controller of the memory apparatus. Further, at least one embodiment of the present inventive concept may provide a method of controlling data in the memory apparatus. Moreover, at least embodiment of the inventive concept may provide a device that includes the memory apparatus.

According to an exemplary embodiment of the present inventive concept, a method of controlling data in a memory apparatus includes buffering data stored in a source memory of a plurality of non-volatile memories via a local bus according to a control signal output from a main controller and transmitting the buffered data to a target memory. The buffering is performed in a first buffer connected to the plurality of non-volatile memories that share a local bus. In transmitting the buffered data to a target memory, the transmitting is performed in the first buffer.

The target memory may be one of the plurality of non-volatile memories that share the local bus. The transmitting of the data to the target memory may include transmitting the data to the target memory via the local bus.

The target memory may be one of a plurality of non-volatile memories that are connected to a second buffer that shares a data bus with the first buffer. The transmitting of the data to the target memory may include transmitting the data to the second buffer via the data bus, where the transmitting is performed in the first buffer, and transmitting the data to the target memory, where the transmitting is performed in the second buffer that has received the data.

In the data controlling method, before transmitting the data to the target memory, the method may further include detecting and correcting an error of the data, where the detecting and correcting is performed in an error correction circuit connected to the first buffer. Alternately, in the data controlling method, before the transmitting of the data to the target memory by the second buffer, the method may further include detecting and correcting an error of the data, where the detecting and correcting is performed in an error correction circuit connected to the second buffer.

According to an exemplary embodiment of the present inventive concept, a memory apparatus includes a local bus, a plurality of non-volatile memories which share the local bus, a first buffer which is connected to the plurality of non-volatile memories via the local bus and buffers data stored in the plurality of non-volatile memories, and a main controller which generates a control signal for controlling the first buffer to buffer data stored in a source memory of the plurality of non-volatile memories and transmits the data to a target memory.

The target memory may be one of the plurality of non-volatile memories that share the local bus. The first buffer may transmit the data to the target memory via the local bus. The memory apparatus may further include an error correction circuit connected to the first buffer, where the error correction circuit detects and corrects an error of the data before the first buffer transmits the data to the target memory.

The target memory may be one of a plurality of non-volatile memories that are connected to a second buffer that share a data bus with the first buffer. The first buffer may transmit the data to the second buffer via the data bus and the second buffer having received the data may transmit the data to the target memory. The memory apparatus may further include an error correction circuit connected to the second buffer, where the error correction circuit detects and corrects an error of the data before the second buffer transmits the data to the target memory.

According to an exemplary embodiment of the present inventive concept, a memory system includes a memory apparatus and a processor which controls the memory apparatus. The memory apparatus includes a local bus, a plurality of non-volatile memories which share the local bus, a first buffer which is connected to the plurality of non-volatile memories via the local bus and buffers data stored in the plurality of non-volatile memories, and a main controller which generates a control signal for controlling the first buffer to buffer data stored in a source memory of the plurality of non-volatile memories and transmits the data to a target memory.

When the target memory is one of the plurality of non-volatile memories that share the local bus, the first buffer may transmit the data to the target memory via the local bus. The memory apparatus may further include an error correction circuit connected to the first buffer, where the error correction circuit detects and corrects an error of the data before the first buffer transmits the data to the target memory.

When the target memory is one of the plurality of non-volatile memories that are connected to the second buffer that shares the data bus with the first buffer, the first buffer may transmit the data to the second buffer via the data bus and the second buffer having received the data may transmit the data to the target memory. The memory apparatus may further include an error correction circuit connected to the second buffer, where the error correction circuit detects and corrects an error of the data before the second buffer transmits the data to the target memory.

According to an exemplary embodiment of the present inventive concept, a solid state drive (SSD) includes a memory system having a memory apparatus and a processor which controls the memory apparatus. The memory apparatus includes a local bus, a plurality of non-volatile memories which share the local bus, a first buffer which is connected to the plurality of non-volatile memories via the local bus and buffers data stored in the plurality of non-volatile memories, and a main controller which generates a control signal for controlling the first buffer to buffer data stored in a source memory of the plurality of non-volatile memories and transmits the data to a target memory.

When the target memory is one of the plurality of non-volatile memories that share the local bus, the first buffer may transmit the data to the target memory via the local bus. The SSD may further include an error correction circuit connected to the first buffer, where the error correction circuit detects and corrects an error of the data before the first buffer transmits the data to the target memory.

When the target memory is one of the plurality of non-volatile memories that are connected to the second buffer that shares the data bus with the first buffer, the first buffer may transmit the data to the second buffer via the data bus and the second buffer having received the data may transmit the data to the target memory. The SSD may further include an error correction circuit connected to the second buffer, where the error correction circuit detects and corrects an error of the data before the second buffer transmits the data to the target memory.

According to an exemplary embodiment of the present inventive concept, a redundant array of independent disks (RAID) system includes a host and a memory system which receives at least one command from the host and performs an operation corresponding to the command. The memory system includes a memory apparatus and a processor which controls the memory apparatus. The memory apparatus includes a local bus, a plurality of non-volatile memories which share the local bus, a first buffer which is connected to the plurality of non-volatile memories via the local bus and buffers data stored in the plurality of non-volatile memories, and a main controller which generates a control signal for controlling the first buffer to buffer data stored in a source memory of the plurality of non-volatile memories and transmits the data to a target memory.

When the target memory is one of the plurality of non-volatile memories that share the local bus, the first buffer may transmit the data to the target memory via the local bus. The memory apparatus may further include an error correction circuit connected to the first buffer, and the error correction circuit detects and corrects an error of the data before the first buffer transmits the data to the target memory.

When the target memory is one of the plurality of non-volatile memories that are connected to the second buffer that shares the data bus with the first buffer, the first buffer may transmit the data to the second buffer via the data bus and the second buffer having received the data may transmit the data to the target memory. The memory apparatus further include an error correction circuit connected to the second buffer, and the error correction circuit detects and corrects an error of the data before the second buffer transmits the data to the target memory.

According to an exemplary embodiment of the inventive concept, a memory apparatus includes a main controller, first and second memory modules, and a data bus. The main controller is configured to output a control signal. The first memory module includes at least one first memory, a first sub-controller, and a first local bus, where the first local bus is shared by the first sub-controller and the at least one first memory. The second memory module includes at least one second memory, a second sub-controller, and a second local bus, where the second local bus is shared by the second sub-controller and the least one second memory. The data bus is shared by the main controller, the first sub-controller, and the second sub-controller. At least one of the sub-controllers is configured to transfer data from a source memory of the memories and a target memory of the memories in response to the control signal.

The control signal may include an address of the source memory and an address of the target memory. During the transfer, the first sub-controller may receive the data from one of the first memories across the first local bus, buffer the data, and send the data across the data bus to the second sub-controller, and then the second sub-controller may buffer the data received across the data bus, and send the buffered data to one of the second memories across the second local bus. Alternately, during the transfer, the first sub-controller (or second sub-controller) may receive the data from one of the first memories (or second memories) across the first local bus (or second local bus), buffer the data, and send the data across the first local bus (or second local bus) to another one of the first memories (or second memories).

The control signal may be sent to the second memory module after being sent to the first memory module, and then the second memory module can maintain a standby state until it receives the control signal.

In at least one embodiment of the inventive concept, the first memories and the first sub-controller are all directly connected to the first local bus, the second memories and the second sub-controller are all directly connected to the second local bus, and the data bus is directly connected to the main controller, the first sub-controller, and the second sub-controller.

BRIEF DESCRIPTION OF THE DRAWINGS

Exemplary embodiments of the present inventive concept will be more clearly understood from the following detailed description when taken in conjunction with the accompanying drawings in which.

DETAILED DESCRIPTION

Figure 1:
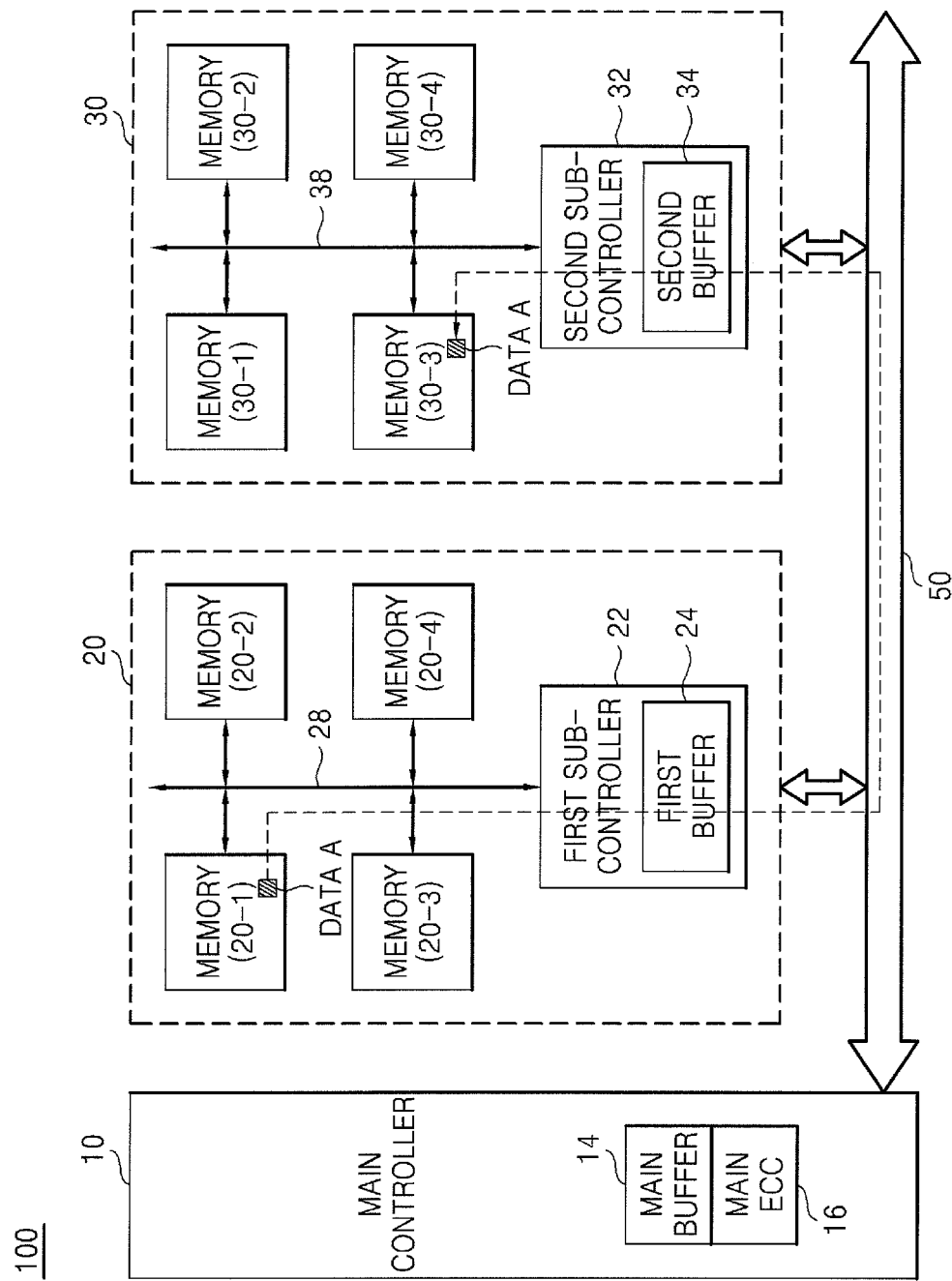
FIG. 1 is a schematic block diagram of a memory system according to an exemplary embodiment of the present inventive concept.

FIG. 1 is a schematic block diagram of a memory system according to an exemplary embodiment of the present inventive concept. A memory apparatus 100 includes a main controller 10, first and second memory modules 20 and 30, and a data bus 50. In at least one embodiment of the inventive concept, each of the memory modules 20 or 30 includes at least one memory. While FIG. 1 illustrates the memory apparatus 100 including the first and second memory modules 20 and 30, in alternate embodiments, the memory apparatus 100 may contain a greater amount of memory modules.

The main controller 10 controls the entire operation of the memory apparatus 100. The main controller 10 may receive commands from a host (not shown). For example, the commands may include a data read command, a data write command, etc. The main controller 10 controls the memory apparatus 100 to perform operations based on the commands. The main controller 10 may generate a control signal for moving the data stored in one memory included in the first or second memory module 20 or 30 to another memory included in the first or second memory module 20 or 30. The main controller 10 may generate a control signal for moving data from the host to a memory included in the first or second memory module 20 or 30. The main controller 10 may control the first or second memory module 20 or 30 by transmitting the control signal to the first or second memory module 20 or 30.

The main controller 10 may include a main buffer 14 and a main error correction circuit (ECC) 16. The main buffer 14 stores the commands received from the host (e.g., the data read command, the data write command, etc.). The main buffer 14 stores various types of data received from the host. The main buffer 14 may also store various types of data that are transmitted from the first memory module 20 or the second memory module 30 to the main controller 10 via the data bus 50.

The main ECC 16 can detect and corrects errors in the various types of data. The main ECC 16 detects and corrects errors of the various commands or data received from the host. The main ECC 16 may also detect and correct errors of data received from the first memory module 20 or the second memory module 30. In at least one embodiment of the inventive concept, the main controller 10 may be implemented as firmware. The main buffer 14 of the main controller 10 may store the firmware. The main controller 10 may further include a host interface for interfacing with the host.

The first memory module 20 includes a plurality of memories 20-1, 20-2, 20-3, and 20-4, a first buffer 24, and a first local bus 28. In alternate embodiments, the memory module 20 may include a lesser or greater number of memories. The first buffer 24 may be included in a first sub-controller 22. The first sub-controller 22 controls the entire operation of the first memory module 20.

The memories 20-1, 20-2, 20-3, and 20-4 read or write various types of data under the control of the main controller 10 or the first sub-controller 22. The memories 20-1, 20-2, 20-3, and 20-4 may store various types of data.

The first sub-controller 22 controls the first memory module 20 to perform operations based on various control signals transmitted by the main controller 10. The first sub-controller 22 may include the first buffer 24.

When a control signal for reading data from the memories 20-1, 20-2, 20-3, and 20-4 of the first memory module 20 is received from the main controller 10, the first sub-controller 22 reads data corresponding to the control signal (hereinafter, referred to as read data) from the memory 20-1, 20-2, 20-3, or 20-4 via the first local bus 28. The first sub-controller 22 stores the read data in the first buffer 24 and then transmits the read data to the main controller 10 via the data bus 50.

For example, when the main controller 10 has transmitted a control signal for reading data from the memory 20-1 to the first sub-controller 22 via the data bus 50, the first sub-controller 22 receives the data stored in the memory 20-1 (e.g., read data) via the first local bus 28 and stores the read data in the first buffer 24. Thereafter, the first sub-controller 22 transmits the read data to the main controller 10 via the data bus 50. The main controller 10 may generate the control signal including information about a location where the read data is stored (e.g., address information about the read data). For example, the address information may specify the memory (e.g., 20-1) in which data is to be read from, the location of the data within the memory, and the module in which the memory is located (e.g., 20). The main controller 10 may control the first memory module 20 to transmit the read data to the main controller 10 by transmitting the control signal including the address information of the read data to the first sub-controller 22.

When the main controller 10 transmits a control signal for writing data to the memory 20-1, 20-2, 20-3, or 20-4 of the first memory module 20, the first sub-controller 22 receives the control signal via the data bus 50. The main controller 10 may generate a control signal including the data written to the first memory module 20 (hereinafter, referred to as write data), and transmit the control signal via the data bus 50. When the write data is received via the data bus 50, the first sub-controller 22 may store the write data in the first buffer 24 and then transmit the write data to a corresponding memory 20-1, 20-2, 20-3, or 20-4 via the first local bus 28 to write the write data to the corresponding memory.

When a control signal for moving the data stored in one of the memories 20-1, 20-2, 20-3, and 20-4 to another memory is received by the first memory module 20 from the main controller 10, the first sub-controller 22 reads data corresponding to the control signal (hereinafter, referred to as moving data) and stores the moving data in the first buffer 24. Thereafter, the first sub-controller 22 transmits the moving data to the other memory 20-1, 20-2, 20-3, or 20-4 via the first local bus 28. Accordingly, when moving the data stored in the memories 20-1, 20-2, 20-3, and 20-4 of the first memory module 20, the first memory module 20 may transmit the moving data directly without passing data through the main controller 10. Hereinafter, a memory where the moving data is originally stored is referred to as a source memory, and a memory in which the moving data is to be newly stored is referred to as a target memory.

When a control signal for moving the data stored in one of the memories 20-1, 20-2, 20-3, and 20-4 (e.g., a source memory) to the memories 30-1, 30-2, 30-3, and 30-4 of the second memory module 30 (e.g., the target memories) is received by the first memory module 20, the first sub-controller 22 receives moving data corresponding to the control signal from the source memory via the first local bus 28.

Thereafter, the first sub-controller 22 transmits the moving data to the second memory module 30 including a target memory via the data bus 50.

Referring to FIG. 1, data "DATA A" is stored in the memory 20-1 of the first memory module 20. When a control signal for moving the data DATA A to the memory 30-3 of the second memory module 30 is transmitted from the main controller 10 to the first memory module 20, the first sub-controller 22 receives the data DATA A from the memory 20-1 corresponding to a source memory via the first local bus 28 and stores the data DATA A in the first buffer 24. The first sub-controller 22 transmits the data DATA A to the second data module 30 including a target memory via the data bus 50. A second sub-controller 32 of the second data module 30 stores the data DATA A in a second buffer 34 and then transmits the data DATA A to the memory 30-3 via a second local bus 38 so that the data DATA A is stored therein. As such, the first memory module 20 may directly transmit data to the second memory module 30 without passing data through the main controller 10.

Similar to the first memory module 20, the second memory module 30 includes the plurality of memories 30-1, 30-2, 30-3, and 30-4, the second buffer 34, and the second local bus 38. However, the memory modules may include a lesser or greater number of memories. In at least one embodiment of the inventive concept, the second buffer 34 may be included in the second sub-controller 32, and the second sub-controller 32 may control the entire operation of the second memory module 30.

The memories 30-1, 30-2, 30-3, and 30-4 read or write various types of data under the control of the main controller 10 or the second sub-controller 32. The memories 30-1, 30-2, 30-3, and 30-4 may also store and retain various types of data.

The second sub-controller 32 controls the second memory module 30 to perform operations based on various control signals transmitted by the main controller 10. The second sub-controller 32 may include the second buffer 34.

When a control signal for reading data from the memories 30-1, 30-2, 30-3, and 30-4 of the second memory module 30 is received from the main controller 10, the second sub-controller 32 reads read data corresponding to the control signal from the memory 30-1, 30-2, 30-3, or 30-4 via the second local bus 38. The second sub-controller 32 stores the read data in the second buffer 34 and then transmits the read data to the main controller 10 via the data bus 50.

When the main controller 10 transmits a control signal for writing data to the memory 30-1, 30-2, 30-3, or 30-4 of the second memory module 30, the second sub-controller 32 receives the control signal via the data bus 50. When the write data is received via the data bus 50, the second sub-controller 32 stores the write data in the second buffer 34 and transmits the write data to a corresponding memory 30-1, 30-2, 30-3, or 30-4 via the second local bus 38, thereby writing the write data therein.

When the second memory module 30 receives a control signal for moving the data stored in one of the memories 30-1, 30-2, 30-3, and 30-4 to another memory from the main controller 10, the second sub-controller 32 reads moving data corresponding to the control signal from the source memory and stores the moving data in the second buffer 34. The second sub-controller 32 transmits the moving data to a target memory via the second local bus 38.

When a control signal for moving the data stored in one of the memories 30-1, 30-2, 30-3, and 30-4 to the memories 20-1, 20-2, 20-3, and 20-4 of the first memory module 20 is received by the second memory module 30, the second sub-controller 32 receives moving data corresponding to the control signal from the source memory from among the memories 30-1, 30-2, 30-3, and 30-4 via the second local bus 38. Thereafter, the second sub-controller 32 transmits the moving data to the first memory module 20 including a target memory via the data bus 50.

In at least one embodiment of the inventive concept, data may be read from or written to the memories 20-1, 20-2, 20-3, 20-4, 30-1, 30-2, 30-3, and 30-4 using a Double Data Rate (DDR) method. Use of the DDR method may enable the memories to obtain high data input/output speeds. The DDR method is a technique in which data is input or output in synchronization with rising edges and falling edges of a data strobe signal. The data strobe signal may be used as a reference clock signal for inputting or outputting data, during a read or write operation of the memories 20-1, 20-2, 20-3, 20-4, 30-1, 30-2, 30-3, and 30-4.

The main controller 10, the first sub-controller 22, or the second sub-controller 32 may generate the data strobe signal. The main controller 10, the first sub-controller 22, or the second sub-controller 32 may receive a data strobe signal from an external source or transmit a data strobe signal to the outside. When the main controller 10, the first sub-controller 22, or the second sub-controller 32 receive a read command or a write command from the host, the main controller 10, the first sub-controller 22, or the second sub-controller 32 may adjust the data strobe signal to have an offset value.

For example, when the first sub-controller 20 and the second sub-controller 30 receive a write command from the host, the first sub-controller 20 and the second sub-controller 30 may receive a local write enable signal or a local read enable signal generated by the main controller 10. The first and second sub-controllers 20 and 30 may generate a read data strobe signal and delay the read data strobe signal by a predetermined value. Accordingly, the delayed read data strobe signal may have the same phase as a write data strobe signal.

When a read command is received from the host, the main controller 10 may transmit the local read enable signal to the first sub-controller 20 or the second sub-controller 30. The first sub-controller 22 or the second sub-controller 32 may generate the write data strobe signal and delay the write data strobe signal by a previously stored value to ensure that the delayed write data strobe signal has the same phase as the read data strobe signal.

A value that determines the degree to which the read data strobe signal or the write data strobe signal is delayed as described above is referred to as an offset value. The offset value may be fixed. In at least one embodiment of the inventive concept, the offset value may be determined by the main controller 10 testing the first memory module 20 or the second memory module 30.

Figure 2:
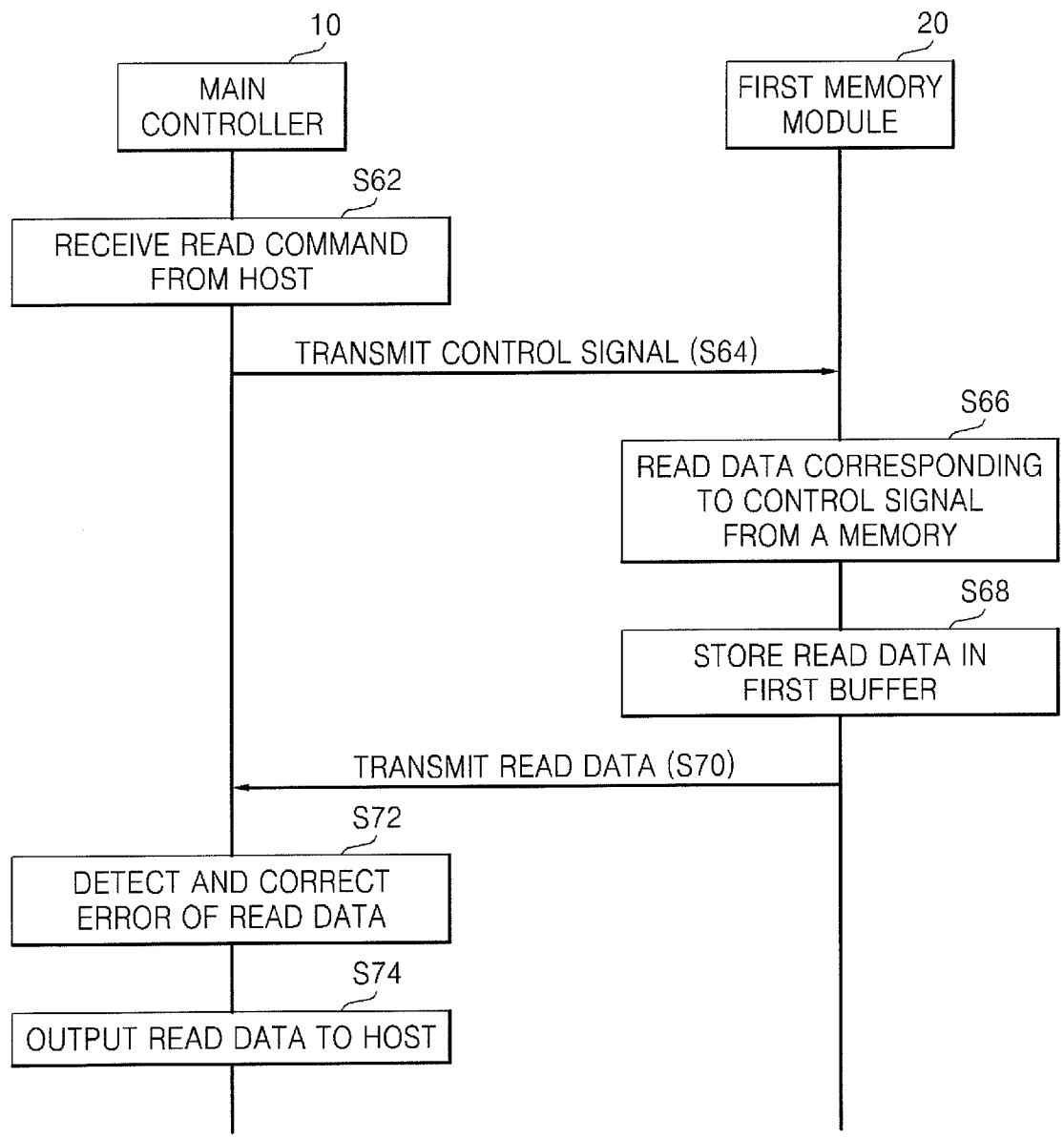
FIG. 2 is a flowchart of a method in which the memory system illustrated in FIG. 1 reads data, according to an exemplary embodiment of the present inventive concept.

FIG. 2 is a flowchart of a method in which the memory system illustrated in FIG. 1 reads data, according to an exemplary embodiment of the present inventive concept. For convenience of explanation, the method describes reading data from the first memory module 20. However, the method may be applied to the other memory module 30. Referring to FIGS. 1 and 2, the main controller 10 receives a read command from the host, in operation S62.

In operation S64, the main controller 10 generates a control signal for performing an operation corresponding to the read command, and transmits the control signal to the first memory module 20. In operation S66, in response to the control signal, the first sub-controller 22 of the first memory module 20 reads data corresponding to the control signal from the memory 20-1, 20-2, 20-3, or 20-4. The control signal may include information about a location where the read data has been stored (e.g., address information) and the first sub-controller 22 reads the read data by using the address information of the read data.

The first sub-controller 22 of the first memory module 20 stores the read data in the first buffer 24 in operation S68, and then transmits the read data to the main controller 10 via the data bus 50 in operation S70. In operation S72, in response to the read data received from the first memory module 20, the main controller 10 detects and corrects an error of the read data. In operation S74, after the error of the read data is corrected, the main controller 10 outputs the read data to the host.

Figure 3:
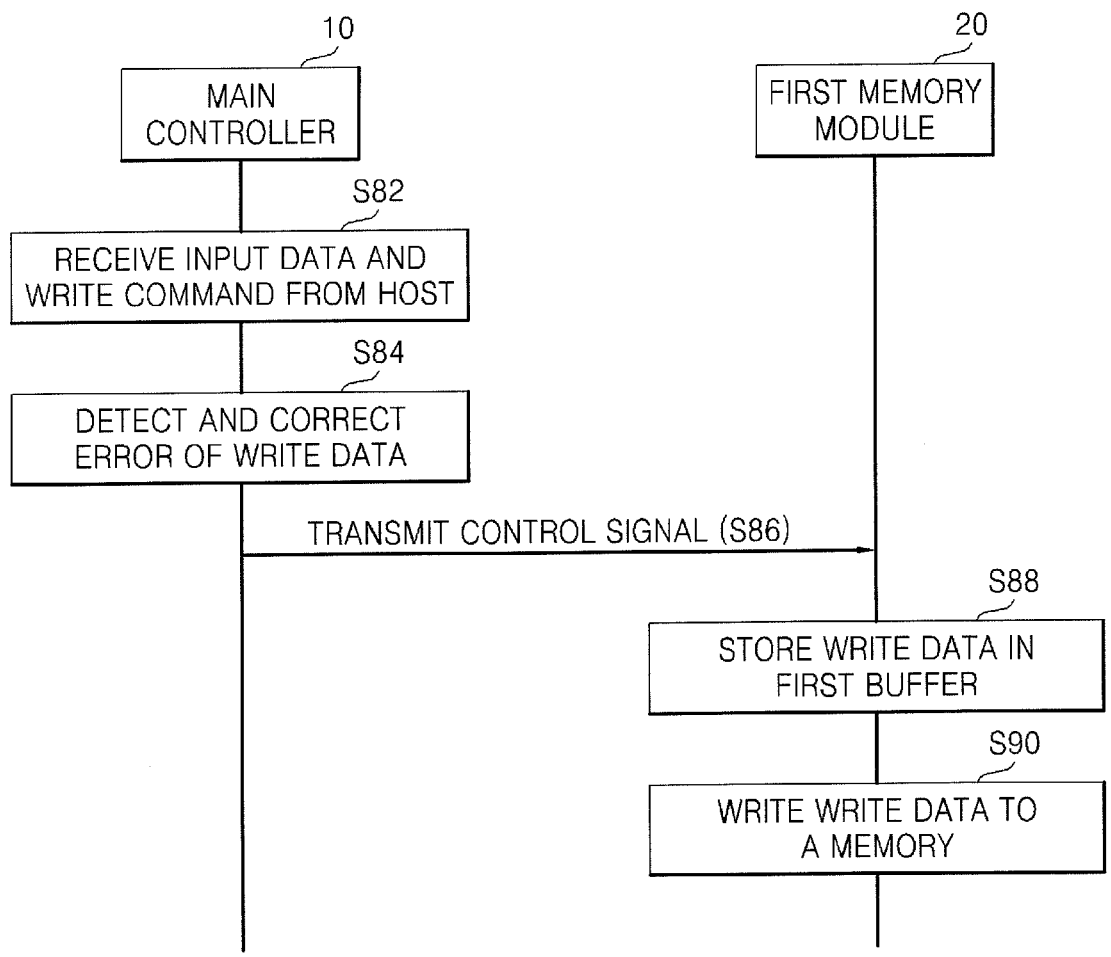
FIG. 3 is a flowchart of a method in which the memory system illustrated in FIG. 1 writes data, according to an exemplary embodiment of the present inventive concept.

FIG. 3 is a flowchart of a method in which the memory system illustrated in FIG. 1 writes data, according to an exemplary embodiment of the present inventive concept. For convenience of explanation, the method describes writing data to the first memory module 20. However, the method may be applied to the other memory module 30. Referring to FIGS. 1 and 3, the main controller 10 receives input data and a write command from the host, in operation S82. In operation S84, the main controller 10 detects and corrects an error of the input data which is to be written according to the write command (e.g., write data). In operation S86, when the error detection and correction with respect to the write data has completed, the main controller 10 generates a control signal for performing an operation corresponding to the write command, and transmits the control signal to the first memory module 20.

In operation S88, in response to the control signal, the first sub-controller 22 of the first memory module 20 stores the write data included in the control signal in the first buffer 24. In operation S90, the first sub-controller 22 writes the write data to the memory 20-1, 20-2, 20-3, or 20-4. The control signal may include information about a location to which the write data is to be written (e.g., address information). For example, the address information may specify the memory (e.g., 20-1) in which data is to be written to, the location within the memory in which the data is to be written, and the module in which the memory is located (e.g., 20). Accordingly, the first sub-controller 22 writes the write data by using the address information of the write data.

Figure 4:
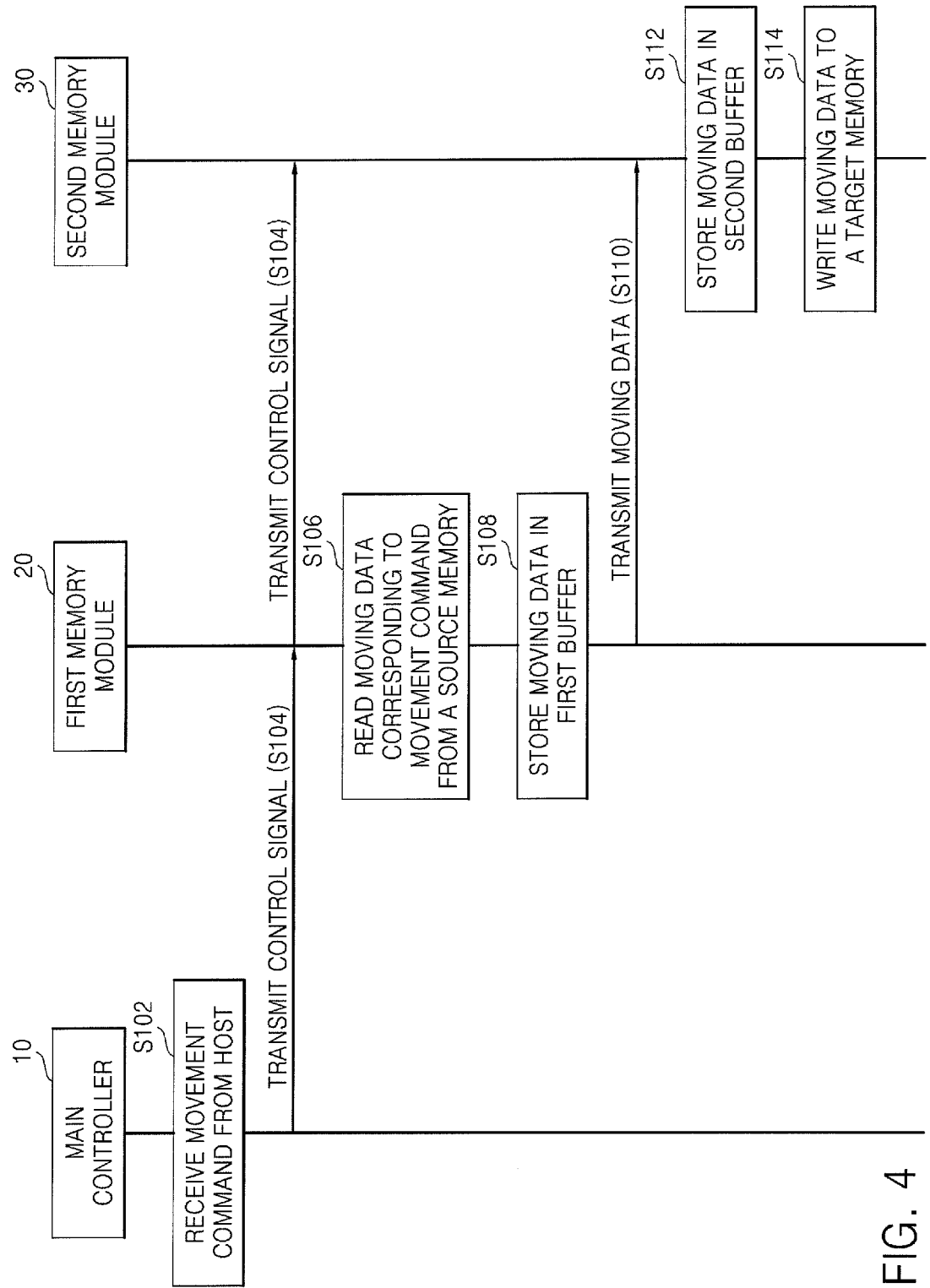
FIG. 4 is a flowchart of a method in which the memory system illustrated in FIG. 1 moves data, according to an exemplary embodiment of the present inventive concept.

FIG. 4 is a flowchart of a method in which the memory system illustrated in FIG. 1 moves data, according to an exemplary embodiment of the present inventive concept. The method describes movement of the data of the first memory module 20 to the second memory module 30 for convenience of explanation. However, the method may be applied to move data from second memory module 30 to the first memory module 20. It is assumed that the first memory module 20 includes a source memory, and the second memory module 30 includes a target memory. Referring to FIGS. 1 and 4, the main controller 10 receives a movement command from the host, in operation S102. In operation S104, the main controller 10 generates a control signal for performing an operation corresponding to the movement command, and transmits the control signal to the first and second memory modules 20 and 30.

In at least one embodiment of the inventive concept, the main controller 10 may transmit the control signal to the second memory module 30 including the target memory earlier than the first memory module 20 including the source memory. When the control signal is transmitted to the second memory module 30 earlier than the first memory module 20, the second memory module 30 may maintain a standby state until data corresponding to the movement command (e.g., moving data) is sent to the data bus 50 by the first memory module 20. During the standby state, the second memory module 30 may be prevented from performing certain operations (e.g., writes, reads, etc.) When the first memory module 20 provides the moving data to the data bus 50, the moving data is shared with the second memory module 30 via the data bus. The second sub-controller 32 of the second memory module 30 may receive the moving data as soon as the moving data is shared by the data bus 50.

In operation S106, in response to the control signal, the first sub-controller 22 of the first memory module 20 reads the moving data corresponding to the control signal from the memory 20-1, 20-2, 20-3, or 20-4 (e.g., from a source memory). The control signal may include information about a location where the moving data has been stored (e.g., address information) and the first sub-controller 22 reads the moving data from the source memory by using the address information of the read data. For example, the address information may specify the source memory in which data is to be read (e.g., 20-1), the location within the source memory in which the data is to be read, the module in which the source memory is located (e.g., 20), the target memory in which the data is to be moved (e.g., 20-2, 30-1, etc.), the location within the target memory in which the data is to be moved, and the module in which the target memory is located (e.g., 20, 30, etc.).

The first sub-controller 22 of the first memory module 20 stores the moving data in the first buffer 24 in operation S108, and then transmits the moving data to the second memory module 30 via the data bus 50 in operation S110.

In operation S112, when the moving data is received from the first memory module 20, the second sub-controller 32 of the second memory module 30 stores the moving data in the second buffer 34. Thereafter, in operation S114, the second sub-controller 32 writes the moving data to the memory 30-1, 30-2, 30-3, or 30-4 (e.g., to a target memory). The control signal transmitted to the second memory module 30 in operation S104 may include address information about a location where the moving data is to be newly written, and the second sub-controller 32 may write the moving data to the target memory by using the address information of the moving data.

In at least one embodiment of the inventive concept, when the moving data is written to the target memory, the main controller 10 may erase the moving data stored in the source memory.

Figure 5:
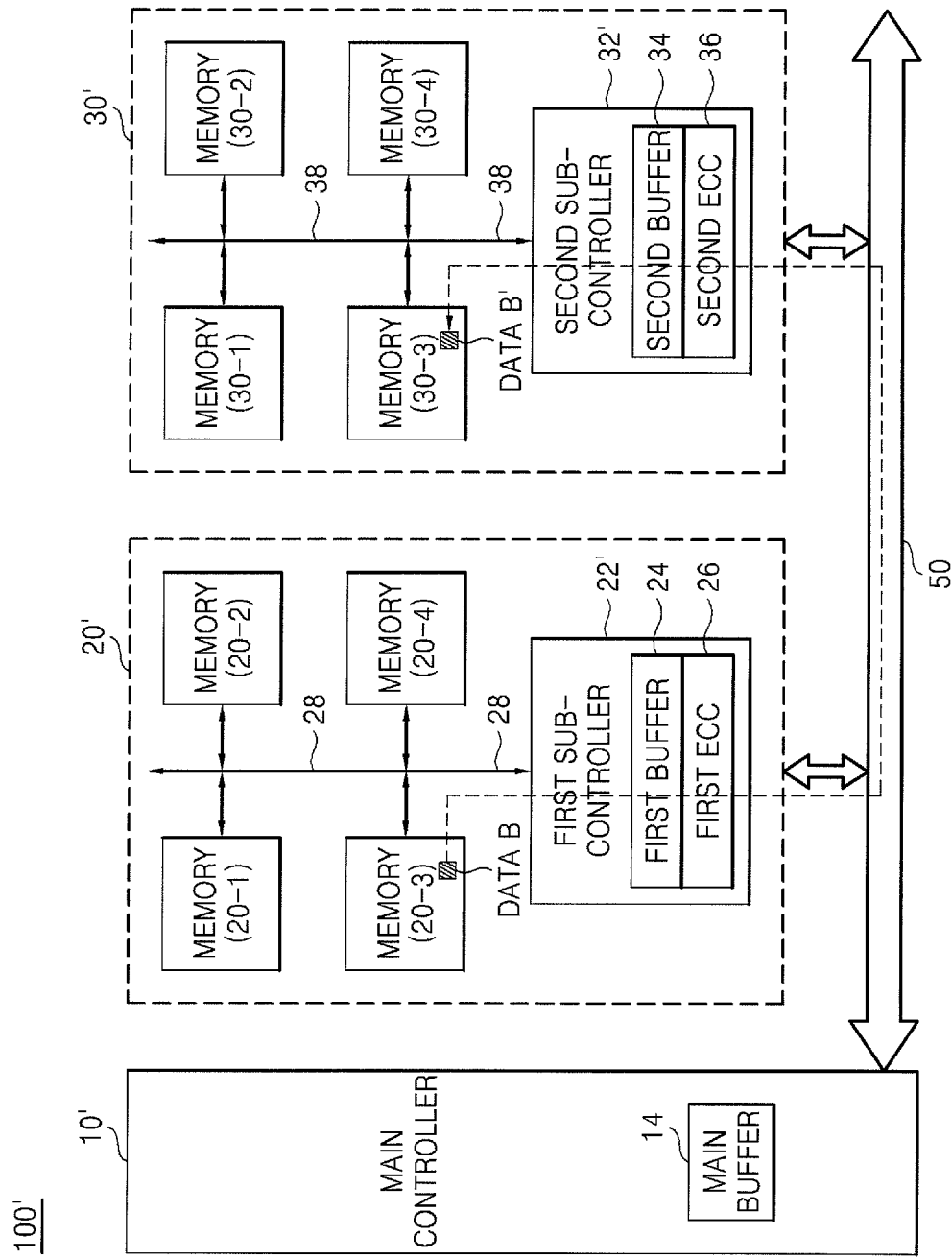
FIG. 5 is a schematic block diagram of a memory system according to an exemplary embodiment of the present inventive concept.

FIG. 5 is a schematic block diagram of a memory system according to an exemplary embodiment of the present inventive concept. Referring to FIG. 5, a memory apparatus 100' includes a main controller 10', first and second memory modules 20' and 30', and the data bus 50. In at least one embodiment of the inventive concept, the memory apparatus 100' may include memory modules 20' or 30' each including at least one memory. While FIG. 5 illustrates the memory apparatus 100' including only the first memory module 20' and the second memory module 30', in alternate embodiments, the memory apparatus may include a greater number of memory modules.

The main controller 10' controls the entire operation of the memory apparatus 100'. The main controller 10' receives commands from a host (not shown). For example, the commands may include a data read command, a data write command, etc. The main controller 10' may control the memory apparatus 100' to perform operations based on the commands. The main controller 10' may generate a control signal for moving the data stored in one memory included in the first or second memory module 20' or 30' to another memory included in the first or second memory module 20' or 30'. The main controller 10' may generate a control signal for moving data of the host to a memory included in the first or second memory module 20' or 30'. The main controller 10' may control the first or second memory module 20' or 30' by transmitting the control signal to the first or second memory module 20' or 30'.

The main controller 10' may include the main buffer 14. The main buffer 14 may store various commands (e.g., the data read command, the data write command, etc.) received from the host. The main buffer 14 may store various types of data received from the host. The main buffer 14 may also store all types of data that are transmitted from the first memory module 20' or the second memory module 30' to the main controller 10' via the data bus 50.

In at least one embodiment of the inventive concept, the main controller 10' may be implemented as firmware. The main buffer 14 of the main controller 10' may store the firmware. The main controller 10' may further include a host interface for interfacing with the host.

The first memory module 20' includes the plurality of memories 20-1, 20-2, 20-3, and 20-4, the first buffer 24, and the first local bus 28. In at least one embodiment of the inventive concept, the first buffer 24 may be included in a first sub-controller 22'. The first sub-controller 22' may control the entire operation of the first memory module 20'.

Various types of data may be read from or written to the memories 20-1, 20-2, 20-3, and 20-4 under the control of the main controller 10' or the first sub-controller 22'. The memories 20-1, 20-2, 20-3, and 20-4 may also store various types of data.

The first sub-controller 22' controls the first memory module 20' to perform operations based on various control signals transmitted by the main controller 10'. The first sub-controller 22' may include the first buffer 24 and a first ECC 26. The first ECC 26 may detect and correct errors of various types of data written to or read from the first memory module 20'.

When a control signal for reading data from the memories 20-1, 20-2, 20-3, and 20-4 of the first memory module 20' is received from the main controller 10', the first sub-controller 22' reads read data corresponding to the control signal from the memory 20-1, 20-2, 20-3, or 20-4 via the first local bus 28. The first sub-controller 22' stores the read data in the first buffer 24 and then transmits the read data to the main controller 10' via the data bus 50.

For example, when the main controller 10' has transmitted a control signal for reading data from the memory 20-1 to the first sub-controller 22' via the data bus 50, the first sub-controller 22' receives data stored in the memory 20-1 (e.g., read data) via the first local bus 28 and stores the read data in the first buffer 24. Thereafter, the sub-controller 22' may detect and correct an error of the read data by using the first ECC 26. When the error detection and correction with respect to the read data has completed, the first sub-controller 22' transmits the read data to the main controller 10' via the data bus 50.

The main controller 10' may generate the control signal including information about a location where the read data has been stored (e.g., address information about the read data). The main controller 10' may control the first memory module 20' to transmit the read data to the main controller 10' by transmitting the control signal including the address information of the read data to the first sub-controller 22'.

When the main controller 10' transmits a control signal for writing data to the memory 20-1, 20-2, 20-3, or 20-4 of the first memory module 20', the first sub-controller 22' receives the control signal via the data bus 50. The main controller 10' may generate a control signal including write data to be written to the first memory module 20', and transmit the control signal via the data bus 50. When the write data is received via the data bus 50, the first sub-controller 22' stores the write data in the first buffer 24 and transmits the write data to a corresponding memory 20-1, 20-2, 20-3, or 20-4 via the first local bus 28, thereby writing the write data therein.

In at least one embodiment of the inventive concept, the first sub-controller 22' may detect and correct an error of the write data by using the first ECC 26 before writing the write data to the memories 20-1, 20-2, 20-3, and 20-4.

When the first memory module 20' receives a control signal for moving the data stored in one of the memories 20-1, 20-2, 20-3, and 20-4 to another memory from the main controller 10', the first sub-controller 22' reads moving data corresponding to the control signal from the source memory from among the memories 20-1, 20-2, 20-3, and 20-4 and stores the moving data in the first buffer 24. Thereafter, the first sub-controller 22' transmits the moving data to the other memory 20-1, 20-2, 20-3, or 20-4 (e.g., a target memory) via the first local bus 28. Accordingly, when moving the data stored in a source memory of the first memory module 20', the first memory module 20' may transmit the moving data directly to a target memory without passing data through the main controller 10'.

When a control signal for moving the data stored in one of the memories 20-1, 20-2, 20-3, and 20-4 to the memories 30-1, 30-2, 30-3, and 30-4 of the second memory module 30' is received by the first memory module 20', the first sub-controller 22' receives moving data corresponding to the control signal from the source memory from among the memories 20-1, 20-2, 20-3, and 20-4 via the first local bus 28. Thereafter, the first sub-controller 22' transmits the moving data to the second memory module 30' including a target memory via the data bus 50.

Referring to FIG. 5, data "DATA B" is stored in the memory 20-3 of the first memory module 20'. It is assumed that a control signal for moving the data DATA B to the memory 30-3 of the second memory module 30' (e.g., a target memory) has been transmitted from the main controller 10' to the first memory module 20'. The first sub-controller 22' receives the data DATA B from the memory 20-3 via the first local bus 28 and stores the data DATA B in the first buffer 24. The first sub-controller 22' transmits the data DATA B to the second data module 30' including the target memory via the data bus 50. The second sub-controller 32' of the second data module 30' stores the data DATA B in the second buffer 34 and then transmits the data DATA B to the memory 30-3 (e.g., the target memory) via the second local bus 38 so that the data DATA B is stored therein. As such, the first memory module 20' may directly transmit moving data to the second memory module 30' without passing data through the main controller 10'.

Similar to the first memory module 20', the second memory module 30' includes the plurality of memories 30-1, 30-2, 30-3, and 30-4, the second buffer 34, and the second local bus 38. In alternate embodiments, either of the memory modules 20' or 30 may include a greater or lesser number of memories. In at least one embodiment of the inventive concept, the second buffer 34 may be included in a second sub-controller 32', and the second sub-controller 32' may control the entire operation of the second memory module 30'.

The memories 30-1, 30-2, 30-3, and 30-4 read or write various types of data under the control of the main controller 10' or the second sub-controller 32'. The memories 30-1, 30-2, 30-3, and 30-4 may also store and retain various types of data.

The second sub-controller 32' controls the second memory module 30' to perform operations based on various control signals transmitted by the main controller 10'. The second sub-controller 32' may include the second buffer 34 and a second ECC 36. The second ECC 36 may detect and correct errors in various types of data written to or read from the second memory module 30'.

When a control signal for reading data from the memories 30-1, 30-2, 30-3, and 30-4 of the second memory module 30' is received from the main controller 10', the second sub-controller 32' reads read data corresponding to the control signal from the memory 30-1, 30-2, 30-3, or 30-4 via the second local bus 38. The second sub-controller 32' stores the read data in the second buffer 34 and then transmits the read data to the main controller 10' via the data bus 50.

When the main controller 10' transmits a control signal for writing data to the memory 30-1, 30-2, 30-3, or 30-4 of the second memory module 30', the second sub-controller 32' receives the control signal via the data bus 50. When the write data is received via the data bus 50, the second sub-controller 32' stores the write data in the second buffer 34 and transmits the write data to a corresponding memory 30-1, 30-2, 30-3, or 30-4 via the second local bus 38, thereby writing the write data therein.

When the second memory module 30' receives a control signal for moving the data stored in one of the memories 30-1, 30-2, 30-3, and 30-4 (e.g., a source memory) to another memory (e.g., a target memory) from the main controller 10', the second sub-controller 32' reads moving data corresponding to the control signal from the source memory and stores the moving data in the second buffer 34. Thereafter, the second sub-controller 32' transmits the moving data to the target memory via the second local bus 38.

When a control signal for moving the data stored in the memory 30-1, 30-2, 30-3, or 30-4 to the memories 20-1, 20-2, 20-3, and 20-4 of the first memory module 20' is received by the second memory module 30', the second sub-controller 32' receives moving data corresponding to the control signal from the source memory (e.g., the memory 30-1, 30-2, 30-3, or 30-4) via the second local bus 38. Thereafter, the second sub-controller 32' transmits the moving data to the first memory module 20' including a target memory via the data bus 50.

Figure 6:
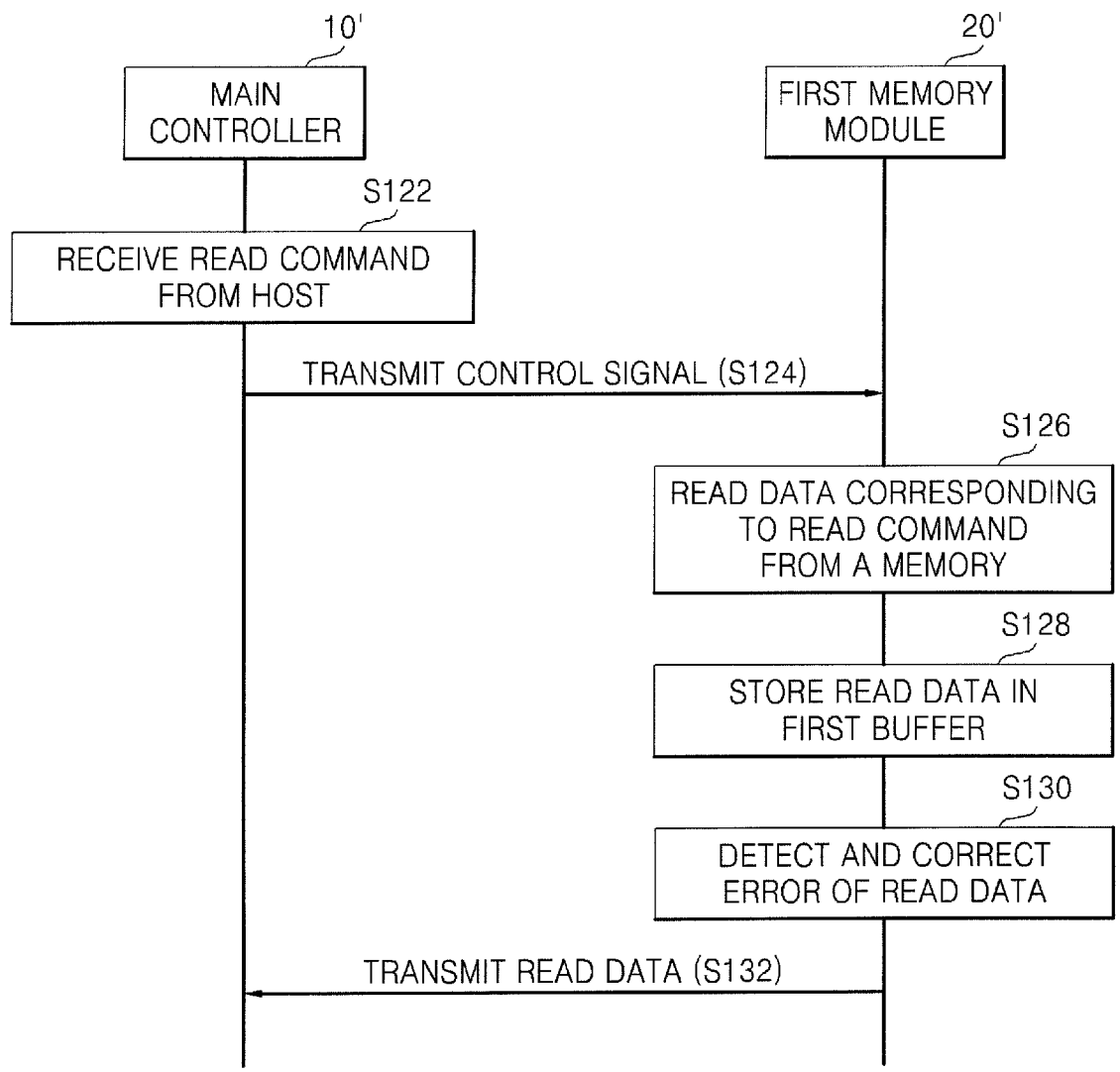
FIG. 6 is a flowchart of a method in which the memory system illustrated in FIG. 5 reads data, according to an exemplary embodiment of the present inventive concept.

FIG. 6 is a flowchart of a method in which the memory system illustrated in FIG. 5 reads data, according to an exemplary embodiment of the present inventive concept. For convenience of explanation, the method describes reading data from the first memory module 20'. However, the method can be applied to the other memory module 30'. Referring to FIGS. 5 and 6, the main controller 10' receives a read command from the host, in operation S122.

In operation S124, the main controller 10' generates a control signal for performing an operation corresponding to the read command, and transmits the control signal to the first memory module 20'. In operation S126, in response to the control signal, the first sub-controller 22' of the first memory module 20' reads data corresponding to the control signal, (e.g., read data) from the memory 20-1, 20-2, 20-3, or 20-4. The control signal may include information about a location where the read data has been stored (e.g., address information) and the first sub-controller 22' may read the read data by using the address information of the read data.

The first sub-controller 22' of the first memory module 20' stores the read data in the first buffer 24 in operation S128, and the first ECC 26 detects and corrects an error of the read data stored in the first buffer 24 in operation S130. When the error detection and correction with respect to the read data has completed, the first sub-controller 22' transmits the read data to the main controller 10' via the data bus 50, in operation S132.

Figure 7:
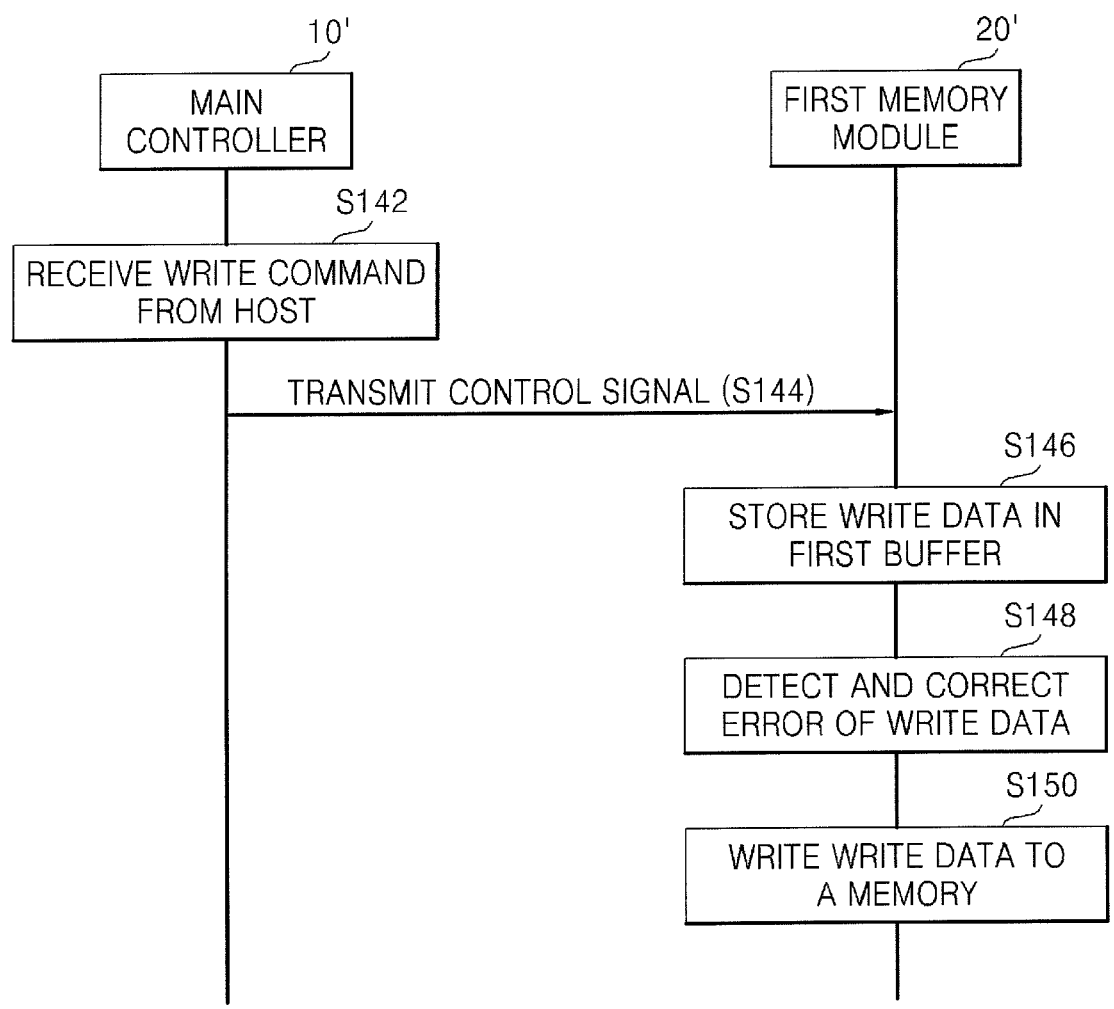
FIG. 7 is a flowchart of a method in which the memory system illustrated in FIG. 5 writes data, according to an exemplary embodiment of the present inventive concept.

FIG. 7 is a flowchart of a method in which the memory system illustrated in FIG. 5 writes data, according to an exemplary embodiment of the present inventive concept. For convenience of explanation, the method is used to write data to the first memory module 20'. However, the method may be applied to the other memory module 30'. Referring to FIGS. 5 and 7, first, the main controller 10' receives a write command from the host, in operation S142. In operation S144, the main controller 10' generates a control signal for performing an operation corresponding to the write command, and transmits the control signal to the first memory module 20'.

In response to the control signal, the first sub-controller 22' of the first memory module 20' stores write data included in the control signal in the first buffer 24 in operation S146, and detects and corrects an error of the write data in operation S148. When the error detection and correction with respect to the write data has completed, the first sub-controller 22' writes the write data to the memory 20-1, 20-2, 20-3, or 20-4, in operation S150.

The control signal may include information about a location where the write data is to be written (e.g., address information) and the first sub-controller 22' writes the write data by using the address information of the write data. When the main controller 10' receives the write command from the host, the main controller 10' may also receive the write data, which is to be stored in the first memory module 20'.

Figure 8:
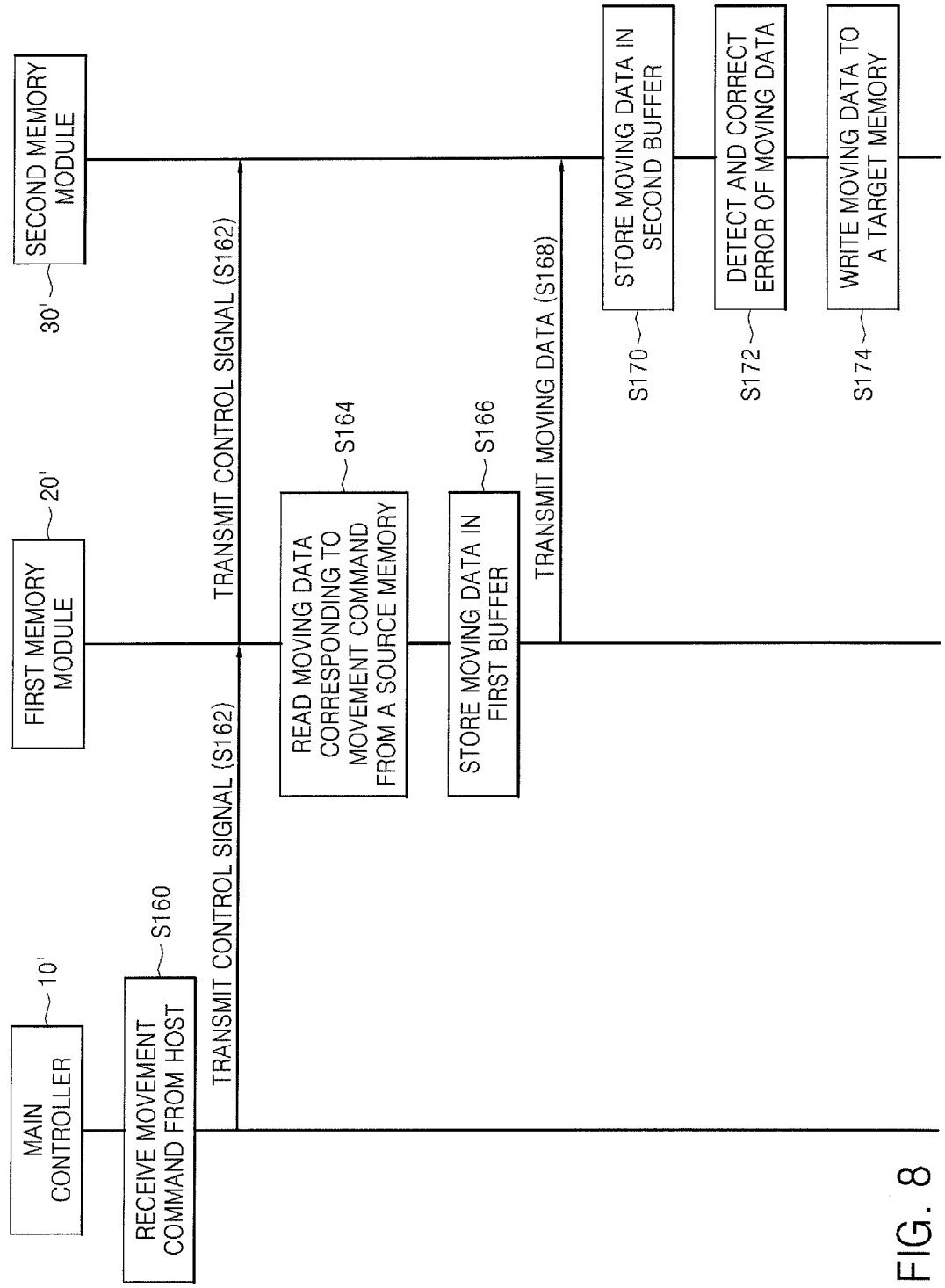
FIG. 8 is a flowchart of a method in which the memory system illustrated in FIG. 5 moves data, according to an exemplary embodiment of the present inventive concept.

FIG. 8 is a flowchart of a method in which the memory system illustrated in FIG. 5 moves data, according to an exemplary embodiment of the present inventive concept. The method of FIG. 8 describes movement of the data of the first memory module 20' to the second memory module 30', for convenience of explanation. However, the method may be applied to move data from the second memory module 30' to the first memory module 20'. It is assumed that the first memory module 20' includes a source memory, and the second memory module 30' includes a target memory.

Referring to FIGS. 5 and 8, the main controller 10' receives a movement command from the host, in operation S160. In operation S162, the main controller 10' generates a control signal for performing an operation corresponding to the movement command, and transmits the control signal to the first and second memory modules 20' and 30'. In at least one exemplary embodiment of the inventive concept, the main controller 10' may transmit the control signal to the second memory module 30' earlier than the first memory module 20'. When the control signal is transmitted to the second memory module 30' earlier than the first memory module 20', the second memory module 30' may maintain a standby state until data corresponding to the movement command (e.g., moving data) is shared by the data bus 50 via the first memory module 20'. During the standby state, the second memory module 30' may be prevented from performing certain operations (e.g., writing, reading, etc.).

In operation S164, in response to the control signal, the first sub-controller 22' of the first memory module 20' reads the moving data corresponding to the control signal from the memory 20-1, 20-2, 20-3, or 20-4 (e.g., a source memory). The control signal may include information about a location where the moving data has been stored (e.g., address information) and the first sub-controller 22' reads the moving data from the source memory by using the address information of the moving data.

The first sub-controller 22' of the first memory module 20' stores the moving data in the first buffer 24 in operation S166, and then transmits the moving data to the second memory module 30' via the data bus 50 in operation S168.

In operation S170, when the moving data is received from the first memory module 20', the second sub-controller 32' of the second memory module 30' stores the moving data in the second buffer 34. In operation S172, the second sub-controller 32' detects and corrects an error of the moving data by using the second ECC 36. Thereafter, in operation S174, the second sub-controller 32' writes the moving data to the memory 30-1, 30-2, 30-3, or 30-4 (e.g., a target memory). The control signal transmitted from the main controller 10' to the second memory module 30' in operation S162 may include address information about a location to which the moving data is to be newly written. Accordingly, the second sub-controller 32' writes the moving data to the target memory by using the address information of the moving data.

While the second ECC 36 has been described detecting and correcting data moved from the first memory module 20' to the second memory module 30', in an alternate embodiment, the first ECC 26 of the first memory module 20' may be used detect and correct errors on the data that is to be moved before it is transmitted to the second memory module 30'.

In at least one embodiment, the main controller 10' may specify in the control signal which ECC is to be perform the error correcting. For example, if the first ECC 26 is specified in the control signal, the error correcting is performed on the data in the first module 20' before it is moved to the second module 30', and if the second ECC 36 is specified, the error correcting is performed on the data in the second module 20' after it the data has been moved.

Figure 9:
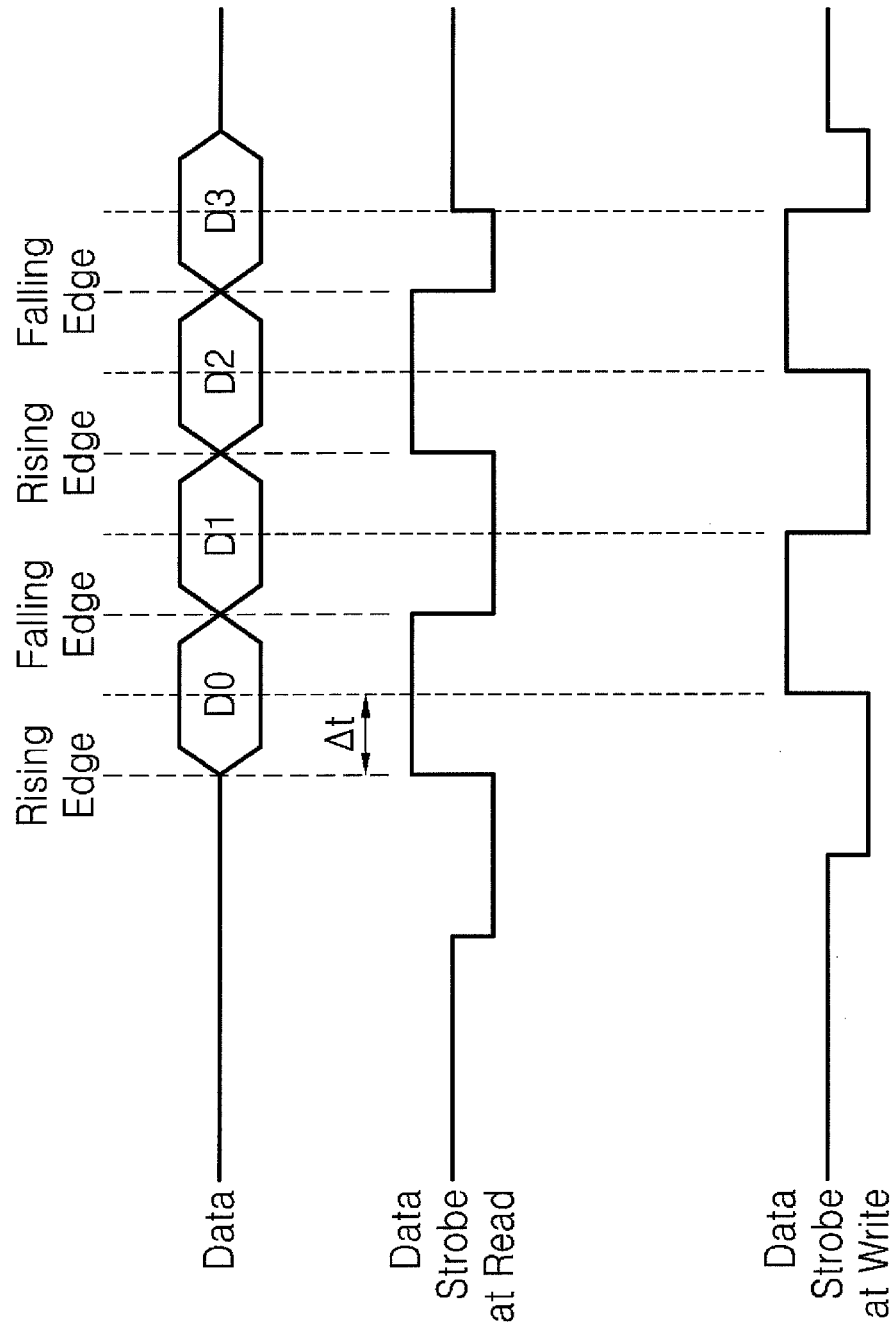
FIG. 9 is a block diagram illustrating an exemplary data strobe signal that may be generated by a first sub-controller or a second sub-controller of the memory system illustrated in FIG. 1.

FIG. 9 is a block diagram illustrating an example of data strobe signal that may be generated by the first sub-controller 22 or the second sub-controller 32 of the memory system illustrated in FIG. 1. FIG. 9 illustrates a data signal depending on the data strobe signal when a read operation and a write operation are performed. When the data strobe signal is toggled, read data or write data is output outside at least one of the memories 20-1 through 20-4 and the memories 30-1 through 30-4 or input to at least one the memories 20-1 through 20-4 and the memories 30-1 through 30-4. For example, when the logic state of the data strobe signal is changed from '0' (or logic 'low') to '1' (or logic 'high'), read data or write data is output outside at least one of the memories 20-1 through 20-4 and the memories 30-1 through 30-4 or input to at least one of the memories 20-1 through 20-4 and the memories 30-1 through 30-4. When the logic state of the data strobe signal is changed from '1' (or logic 'high') to '0' (or logic 'low'), data is output to outside at least one of the memories 20-1 through 20-4 and the memories 30-1 through 30-4 or input to at least one of the memories 20-1 through 20-4 and the memories 30-1 through 30-4.

When a read operation is performed on at least one of the memories 20-1 through 20-4 and the memories 30-1 through 30-4, the data strobe signal may be synchronized with edges of the data signal corresponding to the read data and output outside of at least one of the memories 20-1 through 20-4 and the memories 30-1 through 30-4. For example, rising edges or falling edges of the data strobe signal may coincide with those of the data signal.

When a write operation is performed on at least one of the memories 20-1 through 20-4 and the memories 30-1 through 30-4, the data strobe signal may be synchronized with the centers of the data signal and input to the memory apparatus 100 together with the data signal. For example, rising edges or falling edges of the data strobe signal may coincide with the centers of the data signal. Accordingly, a time difference Δt may be present between the data strobe signal during the write operation and the data strobe signal during the read operation.

In at least one embodiment of the inventive concept, when data is directly transmitted and received between the memories 20-1 through 20-4 and the memories 30-1 through 30-4, the first sub-controller 22 or the second sub-controller 32 provides a read command, read data, and a read data strobe signal to a source memory. The first sub-controller 22 or the second sub-controller 32 may also provide a target memory with a write command, write data shared by the data bus 50, and a write data strobe signal shared by the data bus 50. Accordingly, the first or second sub-controller 22 or 32 of the first or second memory module 20 or 30 including a target memory may perform a write operation by adjusting the read data strobe signal to have a predetermined offset value.

Figure 10:
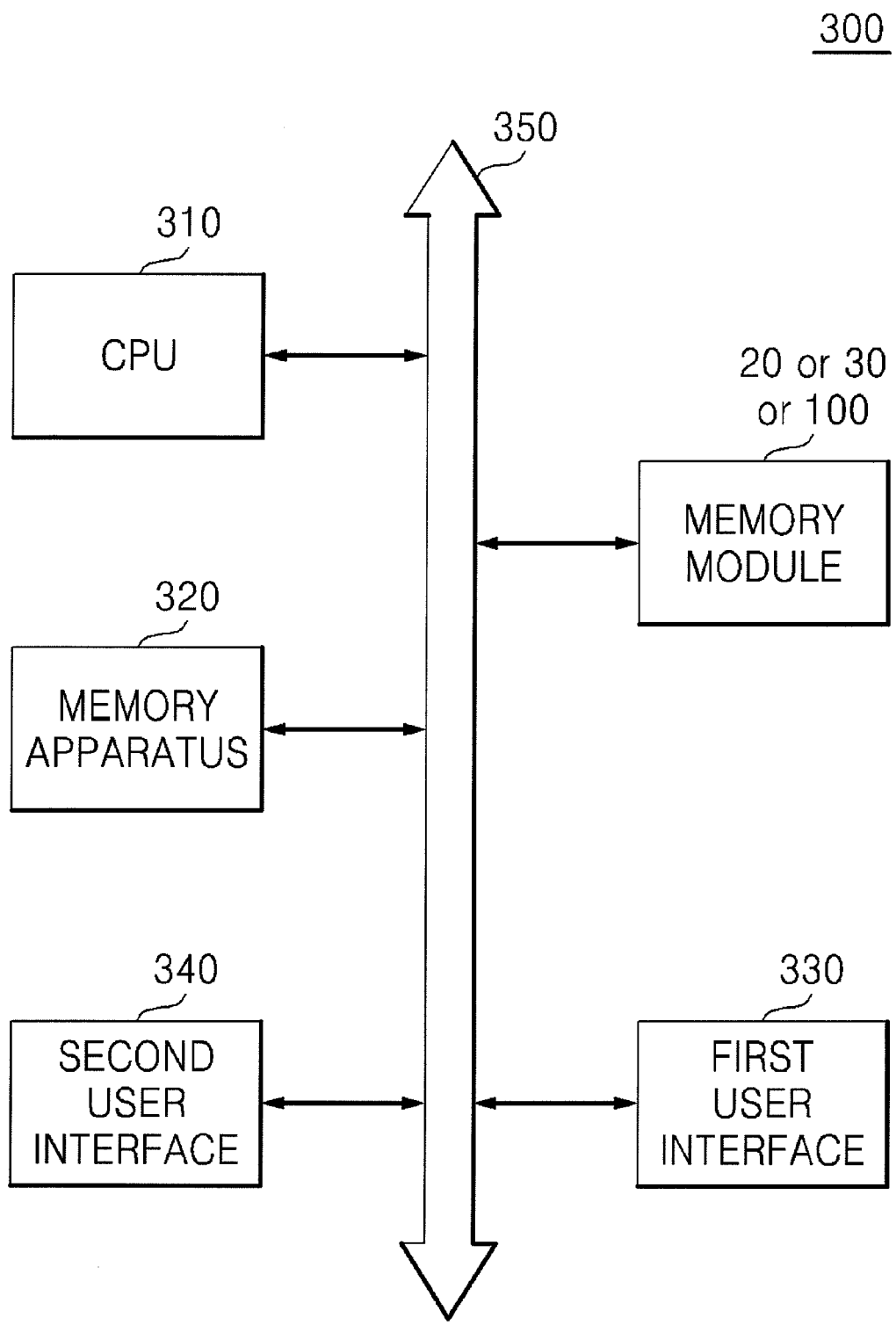
FIG. 10 is a block diagram showing an exemplary embodiment of a memory system including the memory module illustrated in FIG. 1.

FIG. 10 is a block diagram showing an exemplary embodiment of a memory system 300 including the memory module illustrated in FIG. 1. Referring to FIG. 10, the memory system 300 may be included in a cellular phone, a smart phone, a personal digital assistant (PDA), a digital camera, a portable game console, an MP3 player, a high-definition television (HDTV), a global positioning system (GPS), a navigator, consumer equipment (CE), a digital set top box, an information technology (IT) apparatus, etc.

The memory system 300 may include a central processing unit (CPU) 310 and the first or second memory module 20 or 30 or the memory apparatus 100, which are connected to each other via a bus 350.

The CPU 310 may control operations of the first or second memory module 20 or 30 or the memory apparatus 100, for example, a program operation, a write operation, an erase operation, a verify operation, an operation of transmitting data to a host, etc. A memory apparatus 320 connected to the bus 350 may be used as an operation memory of the CPU 310. The memory apparatus 320 may be a dynamic random-access memory (DRAM) or a static random-access memory (SRAM). The memory apparatus 320 may be a memory module including the memories 20-1 through 20-4 or the memories 30-1 through 30-4 illustrated in FIG. 1, for example, a single in-line memory module (SIMM) or a dual in-line memory module (DIMM).

The memory system 300 may further include a first user interface 330 such as a display or a touch pad. The memory system 300 may further include a second user interface 340 such as an input/output interface. The second user interface 340 may be an output device such as a printer, or an input device such as a mouse or a keyboard.

Figure 11:
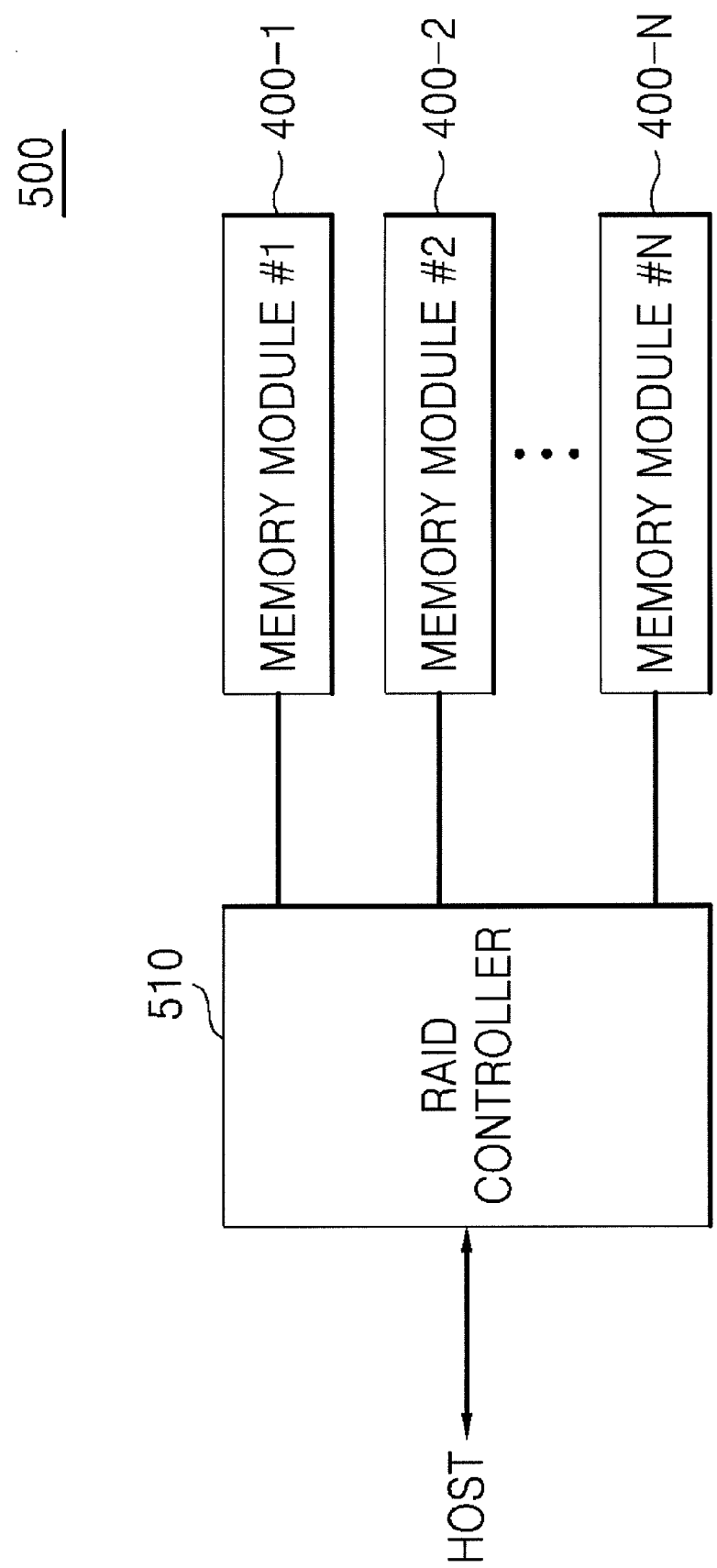
FIG. 11 is a schematic block diagram of a redundant array of independent disks (RAID) system including memory modules, according to an exemplary embodiment of the present inventive concept.

FIG. 11 is a schematic block diagram of a redundant array of independent disks (RAID) system 500 including memory modules, according to an exemplary embodiment of the present inventive concept. Referring to FIG. 11, the RAID system 500 may include a RAID controller 510 and a plurality of memory modules 400-1 through 400-N (where N denotes a natural number).

The memory modules 400-1 through 400-N may be the memory apparatuses 100 or the first or second memory modules 20 or 30 illustrated in FIG. 1. The memory modules 400-1 through 400-N may constitute an RAID array. The RAID system 500 may be included within a personal computer (PC), a solid state drive (SSD), or configured to communicate with remote hosts via a wired/wireless network.

Referring to FIG. 11, the RAID system 500 forms an RAID array, and includes the memory modules 400-1 through 400-N, each including a plurality of non-volatile memories 20, 30, or 100 and a main controller 10 for controlling the operations of the non-volatile memories 20, 30, or 100, and the RAID controller 510 for controlling the operations of the memory modules 400-1 through 400-N.

During a write operation (or a program operation), the RAID controller 510 may output write data (or program data) from a host to one of the memory modules 400-1 through 400-N according to RAID level information output from the host, in response to a write command (or a program command) output from the host.

For example, in RAID Level 0 (also called striping), each segment is written to a different disk, until all drives in the array have been written to, in RAID Level 1 (also called mirroring), each disk is an exact duplicate of all other disks in the array, and in RAID Level 3, every I/O to the array will access all drives in the array, regardless of the type of access (read/write) or the size of the I/O request. The RAID levels provided above are merely examples, as additional RAID levels may be provided.

During a read operation, the RAID controller 510 may transmit to the host data read out from one of the memory modules 400-1 through 400-N according to one selected from a plurality of RAID levels according to the RAID level information, in response to a read command output from the host.

The memories 20-1, 20-2, 20-3, 20-4, 30-1, 30-2, 30-3, and 30-4 described above may be non-volatile memories (e.g., flash memory).

According to at least one embodiment of the present inventive concept, memory modules may be able to transmit data to and receive data from each other without data passing through a main controller. Moreover, since data transmission and reception may be directly performed between memories without passing data through the main controller, a speed at which data is transmitted and received may be increased.

While the present inventive concept has been particularly shown and described with reference to exemplary embodiments thereof, it will be understood that various changes in form and details may be made therein without departing from the spirit and scope of the disclosure.

What is claimed is:

1. A data controlling method performed in a memory apparatus, the method comprising:
    receiving, by a first buffer and a second buffer, a control signal output from a main controller, the control signal comprising an address of a source memory among a plurality of first non-volatile memories that share a first local bus and an address of a target memory among a plurality of second non-volatile memories that share a second local bus, the first buffer connected to the first local bus, the second buffer connected to the second local bus;
    buffering, by the first buffer, data stored in the source memory among the plurality of first non-volatile memories via the first local bus according to the control signal; and
    transmitting, by the first buffer, the buffered data to the target memory over a data bus shared by the main controller, the first buffer, and the second buffer,
    wherein the first local bus is connected to all the first non-volatile memories and a first sub-controller within a first memory module, and the first sub-controller is for controlling the first non-volatile memories;
    wherein the second local bus is connected to all the second non-volatile memories and a second sub-controller within a second memory module, and the second sub-controller is for controlling the second non-volatile memories.

2. The data controlling method of claim 1, further comprising receiving a second control signal from the main controller, wherein the second control signal comprises a second address of a source memory among the plurality of first non-volatile memories and a second address of a target memory among the plurality of first non-volatile memories.

3. The data controlling method of claim 2, further comprising transmitting, by the first buffer, second data from the second source memory to the second target memory via the first local bus.

4. The data controlling method of claim 1, wherein the transmitting the buffered data to the target memory comprises:
    transmitting, by the first buffer, the buffered data to the second buffer via the data bus; and
    transmitting, by the second buffer that has received the buffered data, the buffered data to the target memory.

5. The data controlling method of claim 1, wherein prior to the transmitting the buffered data to the target memory, the method further comprises detecting and correcting, by an error correction circuit connected to the first buffer, an error of the data.

6. The data controlling method of claim 4, prior to the transmitting of the buffered data to the target memory by the second buffer, further comprising detecting and correcting, by an error correction circuit connected to the second buffer, an error of the buffered data.

7. A memory apparatus comprising:
    a first local bus and a second local bus;
    a plurality of first non-volatile memories which share the first local bus;
    a plurality of second non-volatile memories which share the second local bus;
    a first buffer connected to the plurality of first non-volatile memories via the first local bus, wherein the first buffer buffers data stored in the plurality of first non-volatile memories;
    a second buffer connected to the plurality of second non-volatile memories via the second local bus, wherein the second buffer buffers data stored in the plurality of second non-volatile memories;
    a main controller configured to generate a control signal and to send the control signal to the first buffer and the second buffer, the control signal comprising an address of a source memory among the plurality of first non-volatile memories and an address of a target memory among the plurality of second non-volatile memories;
    the first buffer, in response to the control signal, buffering data stored in the source memory and transmitting the data to the target memory over a data bus shared by the main controller, the first buffer, and the second buffer;
    a first sub-controller for controlling the first non-volatile memories,
    wherein the first local bus is connected to all the first non-volatile memories and the first sub-controller; and
    a second sub-controller for controlling the second non-volatile memories,
    wherein the second local bus is connected to all the second non-volatile memories and the second sub-controller.

8. The memory apparatus of claim 7, further comprising the main controller generating a second control signal, wherein the second control signal comprises a second address of a source memory among the plurality of first non-volatile memories and a second address of a target memory among the plurality of first non-volatile memories.

9. The memory apparatus of claim 7, wherein the first buffer transmits second data from the second source memory to the second target memory via the first local bus.

10. The memory apparatus of claim 7, wherein the first buffer transmits the data to the second buffer via the data bus and the second buffer having received the data transmits the data to the target memory.

11. The memory apparatus of claim 7, further comprising an error correction circuit connected to the first buffer,
wherein the error correction circuit detects and corrects an error of the data prior to the first buffer transmitting the data to the target memory.

12. The memory apparatus of claim 7, further comprising an error correction circuit connected to the second buffer, wherein the error correction circuit detects and corrects an error of the data prior to the second buffer transmitting the data to the target memory.

13. A memory apparatus comprising:
a main controller configured to output a control signal;
a first memory module including a plurality of first memories, a first sub-controller controlling the first memories, and a first local bus, wherein the first local bus is shared by the first sub-controller and the first memories, wherein the first local bus is connected to all the first memories and the first sub-controller;
a second memory module including a plurality of second memories, a second sub-controller controlling the second memories, and a second local bus, wherein the second local bus is shared by the second sub-controller and the second memories, wherein the second local bus is connected to all the second memories and the second sub-controller; and
a data bus shared by the main controller, the first sub-controller, and the second sub-controller,
wherein the main controller outputs the control signal to the first memory module and to the second memory module, the control signal including an address of a source memory in the first memory module and an address of a target memory in the second memory module;
wherein the first sub-controller performs a transfer of data from the source memory to the target memory in response to the control signal.

14. The memory apparatus of claim 13, wherein during the transfer,
the first sub-controller receives the data from one of the first memories across the first local bus, buffers the data, and sends the data across the data bus to the second sub-controller,
the second sub-controller buffers the data received across the data bus, and sends the buffered data to one of the second memories across the second local bus.

15. The memory apparatus of claim 13, wherein in response to a second control signal from the main controller including a second address of a source memory in the first memory module and a second address of a target memory in the first memory module, the first sub-controller receives second data from one of the first memories across the first local bus, buffers the second data, and sends the second data across the first local bus to another one of the first memories.

16. The memory apparatus of claim 13, wherein the control signal is sent to the second memory module after being sent to the first memory module, and the second memory module maintains a standby state until receiving the control signal.

17. The memory apparatus of claim 13, wherein the first memories and the first sub-controller are all directly connected to the first local bus,
wherein the second memories and the second sub-controller are all directly connected to the second local bus, and
wherein the data bus is directly connected to the main controller, the first sub-controller, and the second sub-controller.

* * * * *